_(12)_ United States Patent
Uejima et al.

(10) Patent No.: US 7,787,831 B2
(45) Date of Patent: Aug. 31, 2010

(54) HIGH-FREQUENCY SWITCH

(75) Inventors: Takanori Uejima, Moriyama (JP);
Naoki Nakayama, Sakai (JP)

(73) Assignee: Murata Manufacturing Co., Ltd.,
Kyoto (JP)

( * ) Notice: Subject to any disclaimer, the term of this patent is extended or adjusted under 35 U.S.C. 154(b) by 461 days.

(21) Appl. No.: 11/837,078

(22) Filed: Aug. 10, 2007

(65) Prior Publication Data

US 2007/0270105 A1 Nov. 22, 2007

Related U.S. Application Data

(63) Continuation of application No. PCT/JP2006/316185, filed on Aug. 17, 2006.

(30) Foreign Application Priority Data

Aug. 26, 2005 (JP) ............................. 2005-245284

(51) Int. Cl.
*H04B 1/44* (2006.01)
(52) U.S. Cl. ..................... 455/78; 455/82; 455/83; 333/204; 333/262; 333/104; 333/126; 333/132; 333/134; 333/103; 257/275; 257/342; 257/728; 257/664; 257/724
(58) Field of Classification Search ........... 455/78, 455/82, 83; 333/104, 126, 132, 134, 103, 333/204, 262; 257/275, 342, 728, 664, 724
See application file for complete search history.

(56) References Cited

U.S. PATENT DOCUMENTS

| | | | | |
|---|---|---|---|---|
| 4,220,874 A * | 9/1980 | Iwata et al. ................. 327/493 |
| 5,519,364 A * | 5/1996 | Kato et al. ................. 333/103 |
| 5,742,212 A | 4/1998 | Kato et al. |
| 5,914,544 A * | 6/1999 | Tanaka et al. ............... 307/130 |
| 6,448,868 B2 * | 9/2002 | Kato et al. ................. 333/103 |
| 6,586,786 B2 * | 7/2003 | Kitazawa et al. ............ 257/275 |
| 6,633,206 B1 | 10/2003 | Kato |
| 6,639,489 B2 * | 10/2003 | Okuda et al. ............... 333/104 |
| 6,650,199 B2 * | 11/2003 | Dobrovolny ............... 333/103 |
| 6,897,738 B2 | 5/2005 | Kato |
| 7,391,283 B2 * | 6/2008 | Kearns ....................... 333/103 |

(Continued)

FOREIGN PATENT DOCUMENTS

JP 01-233801 A 9/1989

(Continued)

OTHER PUBLICATIONS

Official Communication for PCT Application No. PCT/JP2005/316185; mailed on Oct. 24, 2006.

*Primary Examiner*—Matthew D Anderson
*Assistant Examiner*—April G Gonzales
(74) *Attorney, Agent, or Firm*—Keating & Bennett, LLP (57) ABSTRACT

A high-frequency switch is constructed by connecting a first diode and a second diode that function as switching elements, inductors, capacitors, and resistors. One end of the resistor is connected between the first diode and the second diode, and the other end of the resistor is connected to the ground. Thus, charges accumulated in the diodes in the ON states are immediately released to ground via the resistor. Accordingly, quick switching from the transmission mode to the reception mode by switching of a control power supply terminal from ON to OFF is achieved.

12 Claims, 5 Drawing Sheets

U.S. PATENT DOCUMENTS

| | | | |
|---|---|---|---|
| 7,436,237 B2 * | 10/2008 | Hikita et al. | 327/379 |
| 7,456,703 B2 * | 11/2008 | Uejima et al. | 333/103 |
| 2003/0206079 A1 | 11/2003 | Kato | |
| 2005/0122184 A1 | 6/2005 | Kato | |

FOREIGN PATENT DOCUMENTS

| | | |
|---|---|---|
| JP | 08-018302 A | 1/1996 |
| JP | 09-130101 A | 5/1997 |
| JP | 2000-223901 A | 8/2000 |
| JP | 2002-290268 A | 10/2002 |
| JP | 2003-347962 A | 12/2003 |
| WO | 02/17505 A1 | 2/2002 |

\* cited by examiner

HIGH-FREQUENCY SWITCH

BACKGROUND OF THE INVENTION

1. Field of the Invention

The present invention relates to high-frequency switches, particularly to a high-frequency switch that can be used with a plurality of different mobile communication systems.

2. Description of the Related Art

Figure 5:
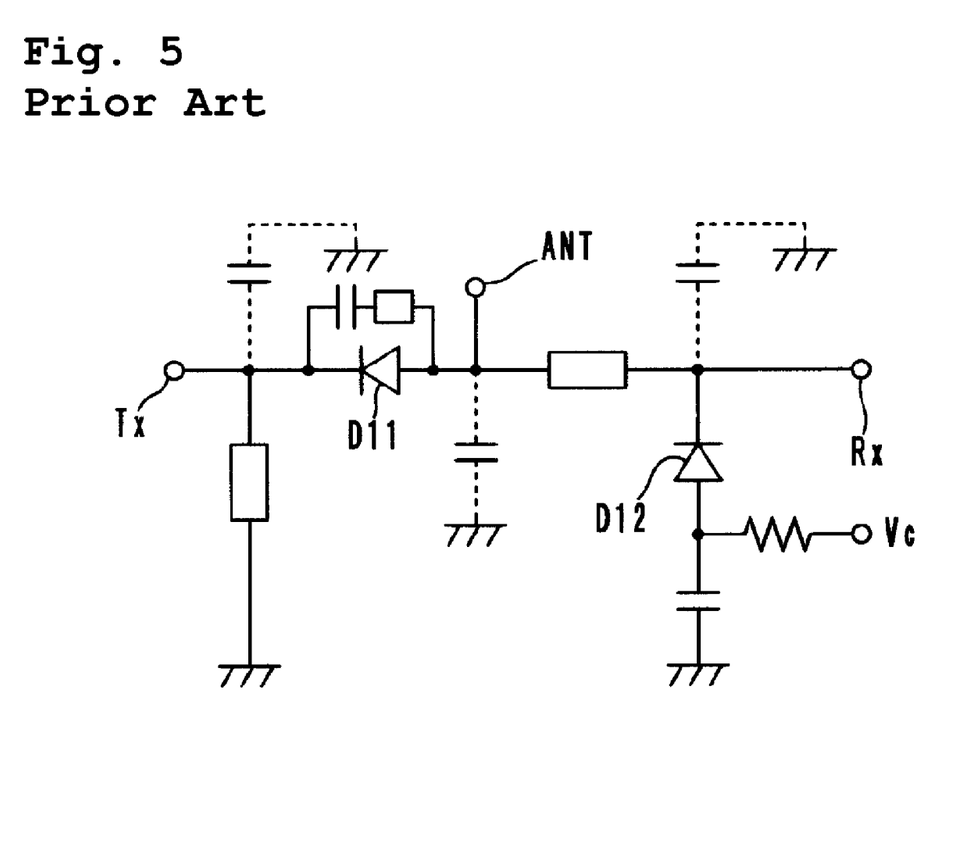
FIG. 5 is an equivalent circuit diagram showing an existing high-frequency switch.

As an existing high-frequency switch of this type, as shown in FIG. 5, a high-frequency switch described in Japanese Unexamined Patent Application Publication No. 2000-223901 (Patent Document 1) includes a first diode D11 and a second diode D12, the first diode D11 being series-connected to a signal path between an antenna terminal ANT and a transmission-side input terminal Tx, and the second diode D12 being shunt-connected to a signal path between the antenna terminal ANT and a reception-side output terminal Rx, and selective switching is performed between the signal path between the antenna terminal ANT and the transmission-side input terminal Tx and the signal path between the antenna terminal ANT and the reception-side output terminal Rx.

The amount of charges accumulated in diodes have variations on the order of ±10% even when the diodes are picked up arbitrarily from the same manufacturing lot. This causes a problem that switching from a transmission mode to a reception mode takes as long as 1 μs or longer in the high-frequency switch.

That is, in the transmission mode, the first and second diodes D11 and D12 are in the ON states, so that charges Q1 are accumulated in the first diode D11 and charges Q2 are accumulated in the second diode D12. Then, when a control power supply terminal Vc is set to 0 V in order to switch from the transmission mode to the reception mode, the charges accumulated in the first and second diodes D11 and D12 are mutually discharged. At this time, when Q1>Q2, the second diode D12 is quickly switched OFF, but it takes a certain time for the charges Q1 to become 0 so that the first diode D11 switches OFF substantially slower than the second diode D12. Thus, in the high-frequency switch, quick switching from the transmission mode to the reception mode is not enabled, so that a transmission signal having a large power leaks to a reception-side signal path.

SUMMARY OF THE INVENTION

In order to overcome the problems described above, preferred embodiments of the present invention provide a high-frequency switch that enables quick switching from a transmission mode to a reception mode, and with which loss of transmission signals and reception signals at the time of turning power on or off is prevented.

A high-frequency switch according to a preferred embodiment of the present invention includes a switch having a first diode and a second diode, the first diode being series-connected to a transmission-side signal path between an antenna terminal and a transmission-side input terminal, the second diode being shunt-connected to a reception-side signal path between the antenna terminal and a reception-side output terminal, the switch enabling selective switching between the transmission-side signal path and the reception-side signal path, wherein one end of a resistor is connected between the first diode and the second diode, and the other end of the resistor is connected to ground.

In the high-frequency switch according to preferred embodiments of the present invention, charges accumulated in the first and second diodes that are series-connected while the first and second diodes in the ON states are immediately released to the ground via the resistor. Thus, regardless of the differences between the amounts of charges accumulated in the first and second diodes, quick switching from a transmission mode to a reception mode by switching of a control power supply terminal from ON to OFF is achieved.

The high-frequency switch according to preferred embodiments of the present invention can be provided in the form of a single-band high-frequency switch, a dual-band high-frequency switch, a triple-band high-frequency, or a quad-band high-frequency switch.

In the high-frequency switch according to preferred embodiments of the present invention, preferably, the other end of the diode shunt-connected to the reception-side output terminal is connected to a control power supply, and is grounded via a capacitor. When the control power supply is turned on, the capacitor and an inductance component of the shunt-side diode in the ON state define a series resonance point with a zero impedance. This prevents a transmission signal from leaking to the reception-side output terminal. Furthermore, when the control power supply is turned off, the capacitor is series-connected to a capacitance component of the shunt-side diode in the OFF state. This reduces the capacitance components associated with the ground side, so that leakage of a reception signal to the ground is alleviated. That is, loss of transmission signals and reception signals can be alleviated.

Furthermore, in the high-frequency switch according to a preferred embodiment of the present invention, the control power supply may be a single power supply (either a positive power supply or a negative power supply). Since alternation between positive and negative does not occur with the single power supply, switching speed is improved.

With the high-frequency switch according to preferred embodiments of the present invention, since the shunt-connected resistor is provided between the first and second diodes that are series-connected, charges are released quickly when the control power supply is turned off. Thus, quick switching from a transmission mode to a reception mode is achieved.

Furthermore, by connecting the other end of the diode shunt-connected to the reception-side output terminal to the control power supply and connecting the other end of the diode to the ground via the capacitor, loss of transmission signals and reception signals is prevented.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Now, high-frequency switches according to preferred embodiments of the present invention will be described with reference to the accompanying drawings.

First Preferred Embodiment

Figure 1:
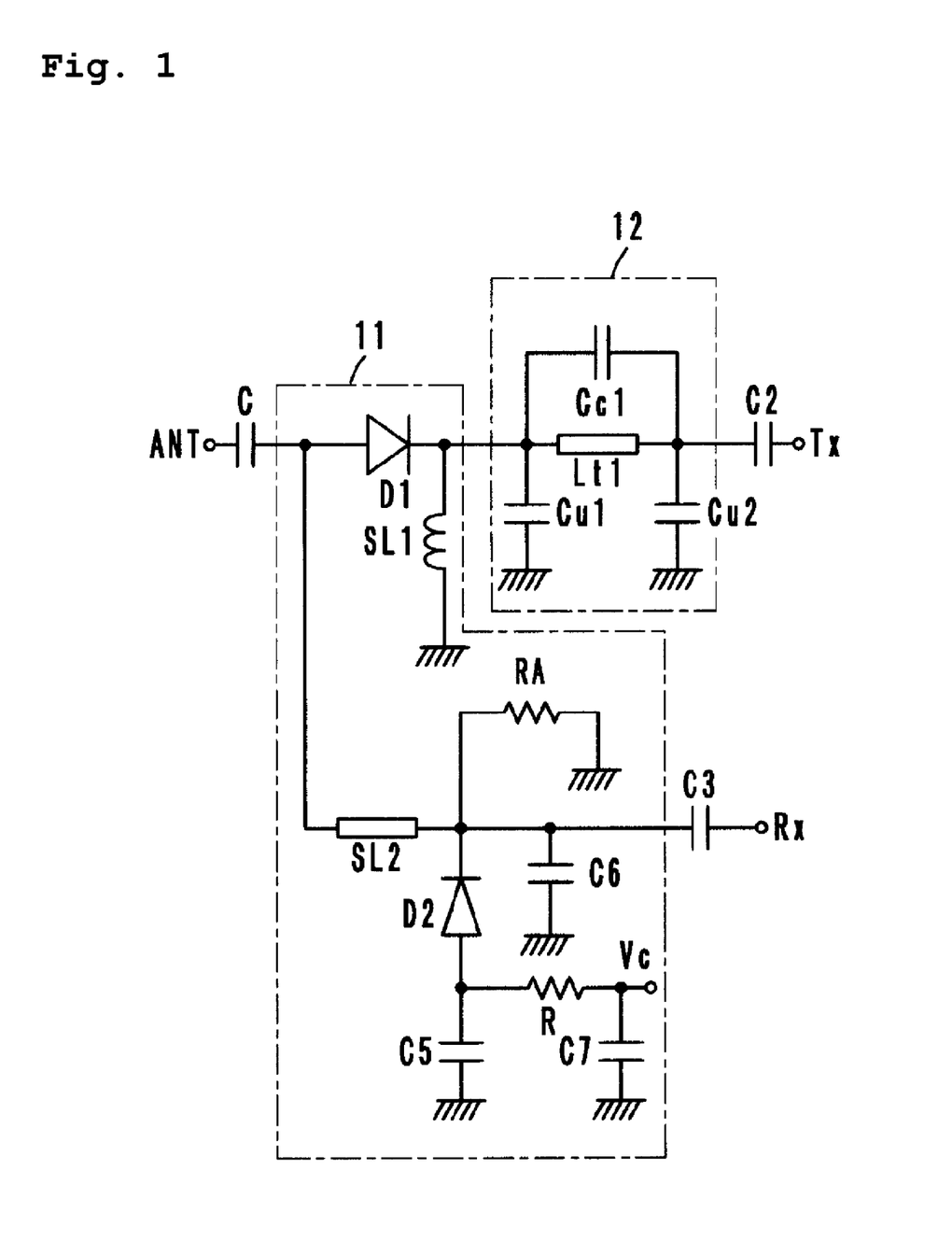
FIG. 1 is an equivalent circuit diagram for explaining a first preferred embodiment of a high-frequency switch according to the present invention.

Shown in FIG. 1

As shown in an equivalent circuit diagram in FIG. 1, a single-band high-frequency switch according to a first preferred embodiment primarily includes a high-frequency switch 11, an LC filter 12, and capacitors C, C2, and C3.

The high-frequency switch 11 enables selective switching between a signal path between an antenna terminal ANT and a transmission-side input terminal Tx and a signal path between the antenna terminal ANT and a reception-side output terminal Rx. The LC filter 12 is disposed between the high-frequency switch 11 and the transmission-side input terminal Tx, and it is a low-pass filter including an inductor Lt1 and capacitors. The capacitors of the low-pass filter include a capacitor Cc1 parallel-connected to the inductor Lt1, and two ground capacitors (shunt capacitors) Cu1 and Cu2 that are connected to the ground.

The high-frequency switch 11 is constructed by connecting a first diode D1 and a second diode D2 that function as switching elements, inductors SL1 and SL2, capacitors C5, C6, and C7, and resistors R and RA. The first diode D1 is series-connected to the signal path between the antenna terminal ANT and the transmission-side input terminal Tx so that the anode thereof is on the side of the antenna terminal ANT. Furthermore, the inductor SL1 is connected between the cathode of the first diode D1 and the ground.

The second diode D2 is shunt-connected on the signal path between the antenna terminal ANT and the reception-side output terminal Rx, and the anode thereof is grounded via the capacitor C5. A control power supply terminal Vc is connected to a node between the second diode D2 and the capacitor C5 via the resistor R, and the capacitor C7 is connected between the control power supply terminal Vc and the ground. Furthermore, the inductor SL2 is series-connected between the cathode of the second diode D2 and the antenna terminal ANT, and the capacitor C6 is connected between the cathode of the second diode D2 and the ground. Furthermore, the resistor RA is connected between the cathode of the second diode D2 and the ground.

Next, an operation of the high-frequency switch configured as described above will be described. First, when transmitting a transmission signal (transmission mode), for example, about 2.5 V is applied to the control power supply terminal Vc to turn on the first diode D1 and the second diode D2 so that a transmission signal input from the transmission-side input terminal Tx is passed through the LC filter 12 and the high-frequency switch 11 and is transmitted from the antenna terminal ANT. On the other hand, since the inductor SL2 is a strip line having a λ/4 line length in relation to the frequency of the transmission signal, the impedance becomes infinite, so that the signal is not passed between the antenna terminal ANT and the reception-side output terminal Rx. Furthermore, the LC filter 12 attenuates harmonics of the transmission signal.

Conversely, when receiving a reception signal (reception mode), for example, 0 V is applied to the control power supply terminal Vc to turn off the first diode D1 and the second diode D2 so that a bypass filter is defined by a capacitance of the first diode D1 in the OFF state and the inductor SL1. This causes a high impedance in the reception band, so that the reception signal is prevented from leaking to the transmission-side input terminal Tx. Thus, the reception signal input from the antenna terminal ANT is output to the reception-side output terminal Rx.

Switching from the transmission mode to the reception mode will now be described. In the transmission mode, the first diode D1 and the second diode D2 are in the ON states. Charges accumulated in the first diode D1 at this time will be denoted as Q1, and charges accumulated in the second diode D2 at this time will be denoted as Q2. In this state, when the control power supply terminal Vc is set to 0 V to switch from the transmission mode to the reception mode, since the grounded resistor RA is connected between the first diode D1 and the second diode D2 that are series-connected, the charges Q1 and Q2 accumulated while the first diode D1 and the second diode D2 are in the ON states are immediately released via the resistor RA. Thus, quick switching from the transmission mode to the reception mode is achieved.

Although the first and second diodes D1 and D2 are usually selected from diodes in the same manufacturing lot, the amounts of the accumulated charges Q1 and Q2 often differ. Particularly, quick switching is not achieved when the amount of the accumulated charges Q1 of the first diode D1 is relatively large. The first preferred embodiment overcomes this problem.

Furthermore, in the first preferred embodiment, the anode of the second diode D2 shunt-connected to the reception-side output terminal Rx is connected to the control power supply terminal Vc, and is connected to the ground via the capacitor C7. Thus, when the control power supply terminal Vc is turned on, a series resonance point with a zero impedance is defined by the capacitor C7 and an inductance component of the second diode D2 in the ON state, so that leakage of the transmission signal to the reception-side output terminal Rx is prevented. Furthermore, when the control power supply terminal Vc is turned off, the capacitor C7 is series-connected to a capacitance component of the second diode D2 in the OFF state. Thus, the capacitance component associated with the ground side is reduced, so that leakage of the reception component to the ground is prevented. This reduces loss of the transmission signal and the reception signal.

In the first preferred embodiment, the high-frequency switch 11 and the LC filter 12 are manufactured together in a multilayer block including a plurality of dielectric layers. Circuits defining a high-frequency switch are manufactured in a multilayer block also in second to fourth preferred embodiments described below.

Second Preferred Embodiment

Figure 2:
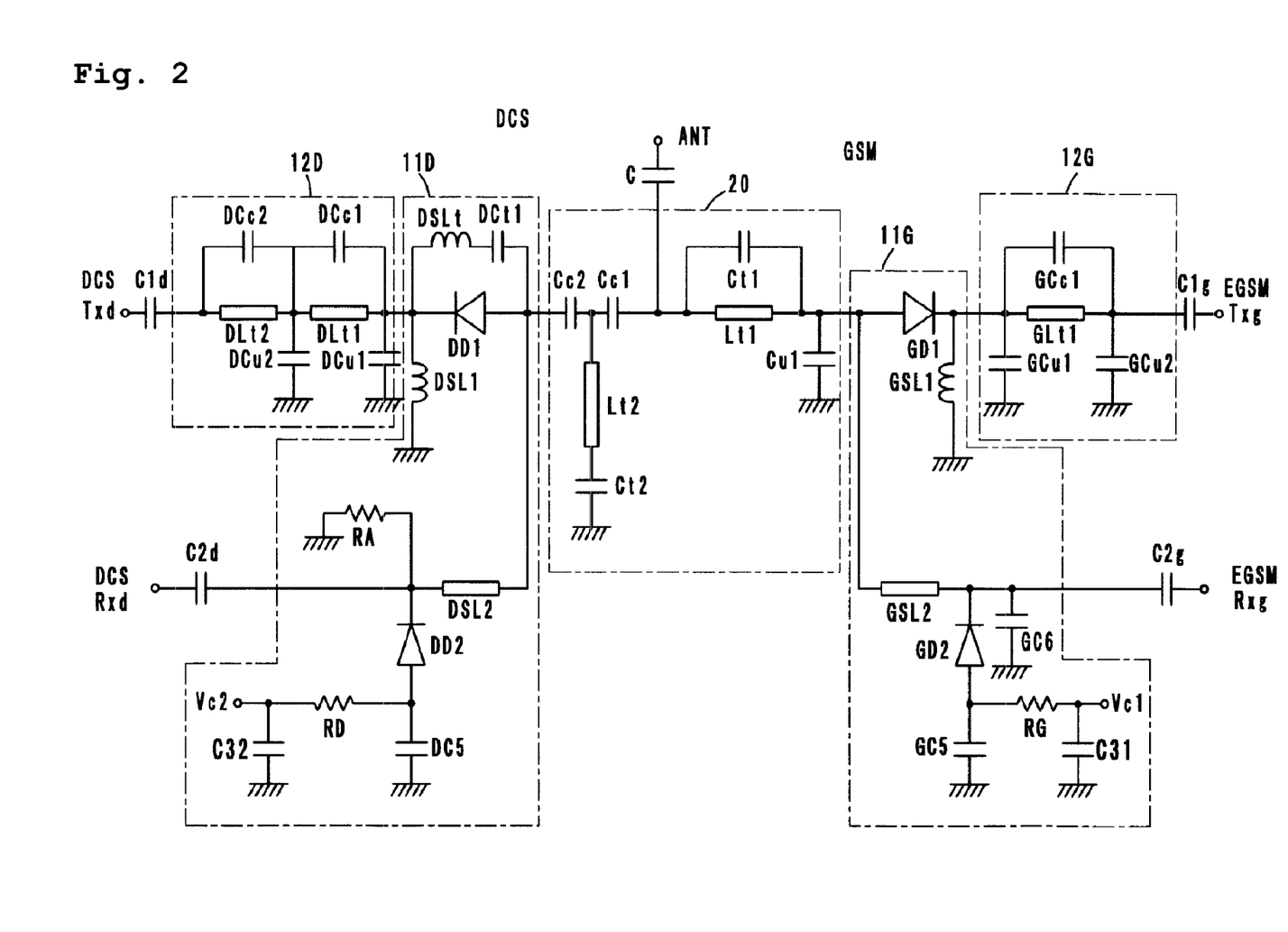
FIG. 2 is an equivalent circuit diagram for explaining a second preferred embodiment of a high-frequency switch according to the present invention.

Shown in FIG. 2

As shown in an equivalent circuit in FIG. 2, a dual-band high-frequency switch (front-end module) according to a second preferred embodiment includes two different communication systems, namely, a GSM communication system and a DCS communication system, and a diplexer 20 that defines a branch between a signal path of the GSM system and a signal path of the DCS system and a capacitor C are provided at a subsequent stage of the antenna terminal ANT. The GSM system includes a first high-frequency switch 11G, a first LC filter 12G, and capacitors C1g and C2g. Similarly, the DCS system includes a second high-frequency switch 11D, a second LC filter 12D, and capacitors C1d and C2d.

The first high-frequency switch 11G enables selective switching between a signal path between the antenna terminal ANT and a first transmission-side input terminal Txg and a signal path between the antenna terminal ANT and a first reception-side output terminal Rxg. The first LC filter 12G is disposed between the first high-frequency switch 11G and the first transmission-side input terminal Txg.

The second high-frequency switch 11D enables selective switching between the antenna terminal ANT and a second transmission-side input terminal Txd and a signal path between the antenna terminal ANT and a second reception-side output terminal Rxd. The second LC filter 12D is disposed between the second high-frequency switch 11D and the second transmission-side input terminal Txd.

The diplexer 20 selects a transmission signal from either the DCS system or the GSM system at the time of transmission, and selects a reception signal to either the DCS system or the GSM system at the time of reception. The diplexer 20 is provided by connecting inductors Lt1 and Lt2 and capacitors Cc1, Cc2, Ct1, Ct2, and Cu1. A parallel circuit including the inductor Lt1 and the capacitor Ct1 is series-connected to the signal path of the GSM system, and one side of the parallel circuit, associated with the first transmission-side input terminal Txg, is grounded via the capacitor Cu1. Furthermore, a series circuit including the capacitors Cc1 and Cc2 is series-connected to the signal path of the DCS system, and a node between the capacitors Cc1 and Cc2 is grounded via the inductor Lt2 and the capacitor Ct2.

The first high-frequency switch 11G includes connecting diodes GD1 and GD2 that function as switching elements, inductors GSL1 and GSL2, capacitors GC5, GC6, and C31, and a resistor RG. The first diode GD1 is series-connected to the signal path of the GSM system between the antenna terminal ANT and the first transmission-side input terminal Txg so that the anode thereof is on the side of the antenna terminal ANT. Furthermore, the inductor GSL1 is connected between the cathode of the first diode GD1 and the ground.

The second diode GD2 is shunt-connected to the signal path of the GSM system between the antenna terminal ANT and the first reception-side output terminal Rxg, and the anode thereof is grounded via the capacitor GC5. A control power supply terminal Vc1 is connected to a node between the second diode GD2 and the capacitor GC5 via the resistor RG. Furthermore, a node between the control power supply terminal Vc1 and the resistor RG is grounded via the capacitor C31. Furthermore, the inductor GSL2 is series-connected to the signal path extending on the side of the antenna terminal ANT from the cathode of the second diode GD2, and the capacitor GC6 is connected between the cathode of the second diode GD2 and the ground.

The second high-frequency switch 11D is provided by connecting diodes DD1 and DD2 that function as switching elements, inductors DSL1, DSL2, and DSLt, capacitors DC5, DCt1, and C32, and resistors RD and RA. The third diode DD1 is series-connected to the signal path of the DCS system between the antenna terminal ANT and the second transmission-side input terminal Txd so that the anode thereof is on the side of the antenna terminal ANT. Furthermore, the inductor DSL1 is connected between the cathode of the third diode DD1 and the ground. Furthermore, a series circuit including the capacitor DCt1 and the inductor DSLt is parallel-connected to the third diode DD1.

The fourth diode DD2 is shunt-connected to the signal path of the DCS system between the antenna terminal ANT and the second reception-side output terminal Rxd, and the anode thereof is grounded via the capacitor DC5. A control power supply terminal Vc2 is connected to a node between the fourth diode DD2 and the capacitor DC5 via the resistor RD. Furthermore, the resistor RA is connected between the cathode of the fourth diode DD2 and the ground. A node between the control power supply terminal Vc2 and the resistor RD is grounded via the capacitor C32. Furthermore, the inductor DSL2 is series-connected to the signal path extending on the side of the antenna terminal ANT from the cathode of the fourth diode DD2.

The first LC filter 12G is disposed between the first high-frequency switch 11G and the first transmission-side input terminal Txg, and it is a low-pass filter including an inductor GLt1 and capacitors. The capacitors of the low-pass filter include a capacitor GCc1 that is parallel-connected to the inductor GLt1, and two ground capacitors (shunt capacitors) GCu1 and GCu2 that are connected to the ground.

The second LC filter 12D is disposed between the second high-frequency switch 11D and the second transmission-side input terminal Txd, and it is defined by series connection of a parallel circuit including the inductor DLt1 and the capacitor DCc1 and a parallel circuit including the inductor DLt2 and the capacitor DCc2. The ends of the inductor DLt1 are grounded via the capacitors DCu1 and DCu2, respectively.

Next, an operation of the high-frequency switch configured as described above will be described. First, when transmitting a transmission signal of the DCS system (1.8 GHz band), in the second high-frequency switch 11D, for example, about 2.5 V is applied to the control power supply terminal Vc2 to turn on the third diode DD1 and the fourth diode DD2. Thus, the transmission signal of the DCS system, input from the second transmission-side input terminal Txd, is passed through the second LC filter 12D, the second high-frequency switch 11D, and the diplexer 20, and is transmitted from the antenna terminal ANT.

At this time, in the first high-frequency switch 11G of the GSM system, for example, 0 V is applied to the control power supply terminal Vc1 to turn off the first diode GD1, so that a transmission signal of the GSM system is not transmitted. Furthermore, by connecting the diplexer 20, the transmission signal of the DCS system is prevented from leaking to the first transmission-side input terminal Txg and the first reception-side output terminal Rxg of the GSM system. Furthermore, the second LC filter 12D of the DCS system attenuates second and third harmonics of the DCS system.

Next, when transmitting a transmission signal of the GSM system (900 MHz band), in the first high-frequency switch 11G, for example, about 2.5 V is applied to the control power supply terminal Vc1 to turn on the first diode GD1 and the second diode GD2. Thus, the transmission signal of the GSM system is passed through the first LC filter 12G, the first high-frequency switch 11G, and the diplexer 20, and is transmitted from the antenna terminal ANT.

At this time, in the second high-frequency switch 11D of the DCS system, for example, 0 V is applied to the control power supply terminal Vc2 to turn off the third diode DD1, so that a transmission signal of the DCS system is not transmitted. Furthermore, by connecting the diplexer 20, the transmission signal of the GSM system is prevented from leaking to the second transmission-side input terminal Txd and the second reception-side output terminal Rxd of the DCS system.

Furthermore, a low-pass filter including the capacitor Ct1, the inductor Lt1, and the shunt capacitor Cu1 of the diplexer 20 attenuates second harmonics of the GSM system, and the first LC filter 12G of the GSM system attenuates third harmonics of the GSM system.

Next, when receiving reception signals of the DCS system and the GSM system, in the second high-frequency switch 11D of the DCS system, for example, 0 V is applied to the control power supply terminal Vc2 to turn off the third diode DD1 and the fourth diode DD2. Furthermore, in the first high-frequency switch 11G of the GSM system 0 V is applied to the control power supply terminal Vc1 to turn off the first diode GD1 and the second diode GD2. Thus, the reception signal of the DCS system is prevented from leaking to the second transmission-side input terminal Txd and the reception signal of the GSM system is prevented from leaking to the first transmission-side input terminal Txg, and the signals input from the antenna terminal ANT are individually output to the reception-side output terminal Rxd of the DCS system and the reception-side output terminal Rxg of the GSM system.

Furthermore, by connecting the diplexer 20, the reception signal of the DCS system is prevented from leaking to the GSM system, and the reception signal of the GSM system is prevented from leaking to the DCS system.

Now, switching from the transmission mode to the reception mode in the DCS system will be described. In the transmission mode, the third diode DD1 and the fourth diode DD2 are in the ON states. Charges accumulated in the third diode DD1 at this time will be denoted as Q1, and charges accumulated in the fourth diode DD2 at this time will be denoted as Q2. In this state, when the control power supply terminal Vc2 is set to about 0 V to switch from the transmission mode to the reception mode, since the grounded resistor RA is connected between the third diode DD1 and the fourth diode DD2 that are series-connected, the charges Q1 and Q2 accumulated while the third diode DD1 and the fourth diode DD2 are in the ON states are immediately released via the resistor RA. Thus, quick switching from the transmission mode to the reception mode is achieved. Particularly, quick switching is not achieved when the amount of the accumulated charges Q1 of the third diode DD1 is large. The second preferred embodiment overcomes this problem, similarly to the first preferred embodiment described earlier.

Also in the GSM system, switching from the transmission mode to the reception mode is performed similarly to the case of the DCS system described above. Also in the GSM system, by shunt-connecting a resistor between the first and second diodes GD1 and GD2, quick switching from the transmission mode to the reception mode can be achieved similarly to the case described above.

Furthermore, in the second preferred embodiment, nodes between the control power supply terminals Vc1 and Vc2 and the anodes of the diodes GD2 and DD2 are connected to the ground via the capacitors C31 and C32. Thus, when the control power supply terminals Vc1 and Vc2 are turned on, series resonance points with zero impedances are provided by the capacitors C31 and C32 and inductance components of the diodes GD2 and DD2 in the ON states. Accordingly, leakage of the transmission signals to the reception-side output terminals Rxg and Rxd is prevented. Furthermore, when the control power supply terminals Vc1 and Vc2 are turned off, the capacitors C31 and C32 are series-connected to capacitance components of the diodes GD2 and DD2 in the OFF states. Thus, the capacitance components on the ground side are reduced, so that leakage of the reception signals to the ground is alleviated. This serves to reduce loss of the transmission signals and the reception signals.

Third Preferred Embodiment

Figure 3:
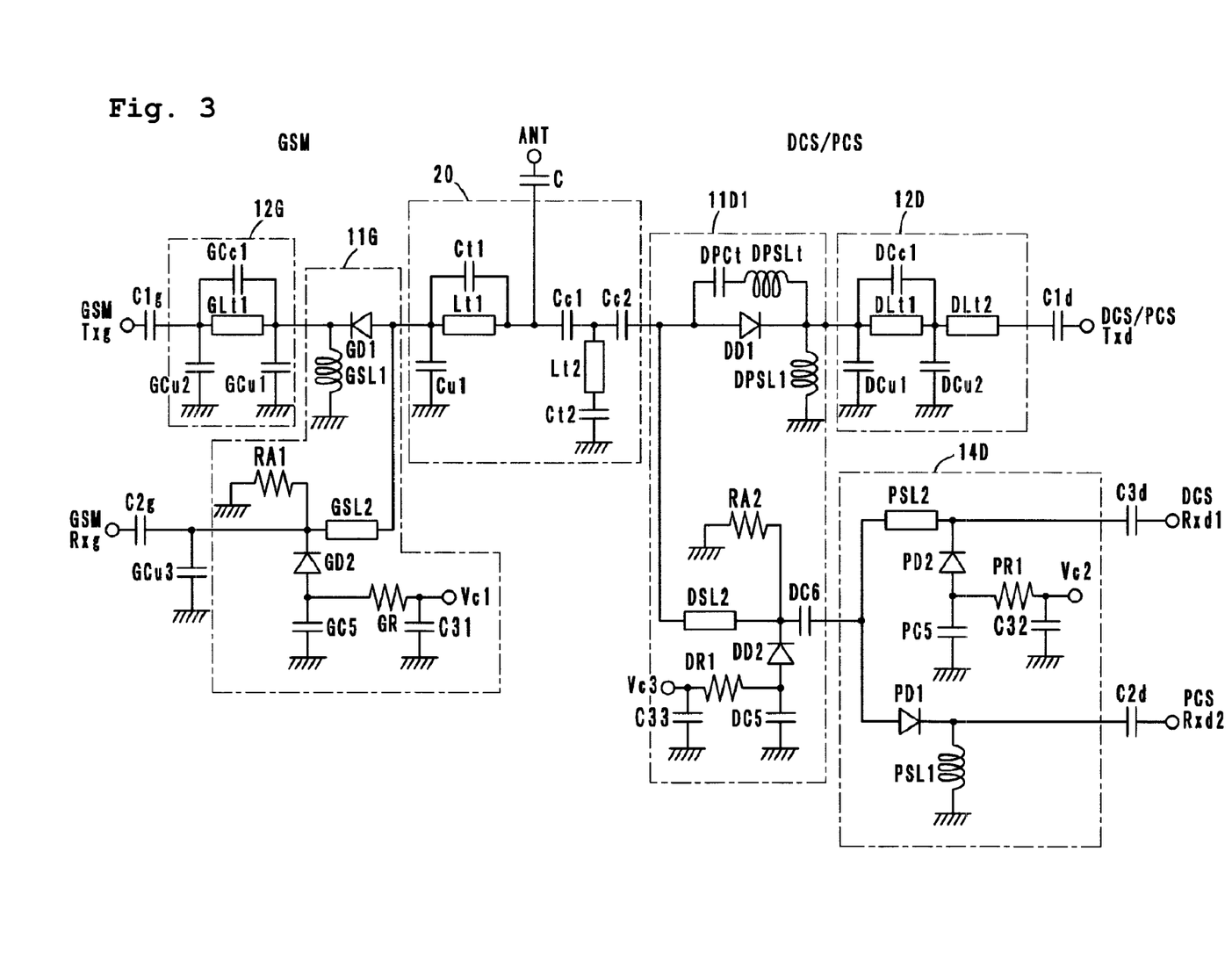
FIG. 3 is an equivalent circuit diagram for explaining a third preferred embodiment of a high-frequency switch according to the present invention.

Shown in FIG. 3

As shown in an equivalent circuit in FIG. 3, a triple-band high-frequency switch according to a third preferred embodiment includes three different communication systems, namely, a GSM system, a DCS system, and a PCS system.

The GSM system includes a first high-frequency switch 11G, a first LC filter 12G, and capacitors C1g, C2g, and GCu3. The configuration and operation of the GSM system are substantially the same as those in the second preferred embodiment described above, so that repeated description will be omitted. Furthermore, a resistor RA1 is connected between the cathode of the second diode GD2 and the ground.

The configuration and operation of the diplexer 20 are also substantially the same as those in the second preferred embodiment described above, so that repeated description will be omitted.

The DCS/PCS systems include a second high-frequency switch 11D1, a second LC filter 12D, a duplexer 14D, and capacitors C1d, C2d, and C3d. The circuit configurations of the second high-frequency switch 11D1 and the second LC filter 12D are substantially the same as those in the second preferred embodiment described above, and repeated description regarding the second LC filter 12D will be omitted.

The duplexer 14D is connected at a subsequent stage of the second high-frequency switch 11D1, and the duplexer 14D defines a branch between a reception signal path of the PCS system and a reception signal path of the DCS system.

The second high-frequency switch 11D1 allows selective switching between a transmission signal path common to the DCS system and the PCS system between the antenna terminal ANT and the second transmission-side input terminal Txd and a reception signal path of the DCS system and a reception signal path of the PCS system between the antenna terminal ANT and second and third reception-side output terminals Rxd1 and Rxd2.

The second high-frequency switch 11D1 is preferably constructed by connecting diodes DD1 and DD2 that function as switching elements, inductors DPSL1, DSL2, and DPSLt, capacitors DC5, DC6, DPCt, and C33, and resistors DR1 and RA2. The third diode DD1 is series-connected to the transmission signal path common to the DCS system and the PCS system between the antenna terminal ANT and the second transmission-side input terminal Txd so that the anode thereof is on the side of the antenna terminal ANT. Furthermore, the inductor DPSL1 is connected between the cathode of the third diode DD1 and the ground. Furthermore, a series circuit including the capacitor DPCt and the inductor DPSLt is parallel-connected to the third diode DD1.

The fourth diode DD2 is shunt-connected to the reception signal path common to the DCS system and the PCS system between the antenna terminal ANT and the duplexer 14D, and the anode thereof is grounded via the capacitor DC5. A control power supply terminal Vc3 is connected to a node between the fourth diode DD2 and the capacitor DC5 via the resistor DR1.

Furthermore, the resistor RA2 is connected between the cathode of the fourth diode DD2 and the ground. A node between the control power supply terminal Vc3 and the resistor DR1 is grounded via the capacitor C33. Furthermore, the inductor DSL2 is series-connected to the signal path extending on the side of the antenna terminal ANT from the cathode of the fourth diode DD2.

The duplexer 14D is preferably constructed by connecting diodes PD1 and PD2 that serve as switching elements, inductors PSL1 and PSL2, capacitors PC5 and C32, and a resistor PR1. The diode PD1 is series-connected to the transmission signal path of the PCS system between the second high-frequency switch 11D1 and the third reception-side output terminal Rxd2 so that the anode thereof is on the side of the second high-frequency switch 11D1. Furthermore, the inductor PSL1 is connected between the cathode of the diode PD1 and the ground. The diode PD2 is shunt-connected to the reception signal path of the DCS system between the second high-frequency switch 11D1 and the second reception-side output terminal Rxd1, and the anode thereof is grounded via the capacitor PC5. A control power supply terminal Vc2 is connected to a node between the diode PD2 and the capacitor PC5 via the resistor PR1. A node between the control power supply terminal Vc2 and the resistor PR1 is grounded via the capacitor C32. Furthermore, the inductor PSL2 is series-connected to the signal path extending on the side of the second high-frequency switch 11D1 from the cathode of the diode PD2.

Next, an operation of the high-frequency switch configured as described above will be described. First, when transmitting a transmission signal of the DCS/PCS system, for example, about 2.5 V is applied to the control power supply terminal Vc3 and 0 V is applied to the control power supply terminals Vc1 and Vc2 to turn on the diodes DD1 and DD2 and turn off the diodes GD1, GD2, PD1, and PD2. Thus, the transmission signal of the DCS/PCS system, input from the second transmission-side input terminal Txd, is passed through the second LC filter 12D, the second high-frequency switch 11D1, and the diplexer 20, and is transmitted from the antenna terminal ANT.

When transmitting a transmission signal of the GSM system, for example, about 2.5 V is applied to the control power supply terminal Vc1 and 0 V is applied to the control power supply terminals Vc2 and Vc3 to turn on the diodes GD1 and GD2 and turn off the diodes DD1, DD2, PD1, and PD2. Thus, the transmission signal of the GSM system, input from the first transmission-side input terminal Txg, is passed through the first LC filter 12G, the first high-frequency switch 11G, and the diplexer 20, and is transmitted from the antenna terminal ANT.

Next, when receiving a reception signal of the DCS system, for example, 0 V is applied to all the control power supply terminals Vc1, Vc2, and Vc3 to turn off the diodes GD1, GD2, DD1, DD2, PD1, and PD2. Thus, the signal input from the antenna terminal ANT is output to the reception-side output terminal Rxd1 of the DCS system.

When receiving a reception signal of the PCS system, for example, about 2.5 V is applied to the control power supply terminal Vc2 and 0 V is applied to the control power supply terminals Vc1 and Vc3 to turn on the diodes PD1 and PD2 and turn off the diodes GD1, GD2, DD1, and DD2. Thus, the signal input from the antenna terminal ANT is output to the reception-side output terminal Rxd2 of the PCS system.

When receiving a reception signal of the GSM system, for example, 0 V is applied to all the control power supply terminals Vc1, Vc2, and Vc3 to turn off the diodes GD1, GD2, DD1, DD2, and PD2. Thus, the signal input from the antenna terminal ANT is output to the reception-side output terminal Rxg of the GSM system.

Furthermore, by connecting the diplexer 20, the reception signal of the DCS/PCS system is prevented from leaking to the GSM system, and the reception signal of the GSM system is prevented from leaking to the DCS/PCS system.

In the switching operations from the transmission mode to the reception mode in the GSM system and the DCS/PCS system, since the grounded resistors RA1 and RA2 are connected between the diodes GD1 and GD2 and the diodes DD1 and DD2, respectively, quick switching from the transmission mode to the reception mode is achieved, as described earlier with the first and second embodiments. Furthermore, since the nodes between the control power supply terminals Vc1, Vc2, and Vc3 and the diodes GD2, PD2, and DD2 are grounded via the capacitors C31, C32, and C33, loss of the transmission signals and the reception signals are reduced, as described earlier with the first and second preferred embodiments.

Fourth Preferred Embodiment

Figure 4:
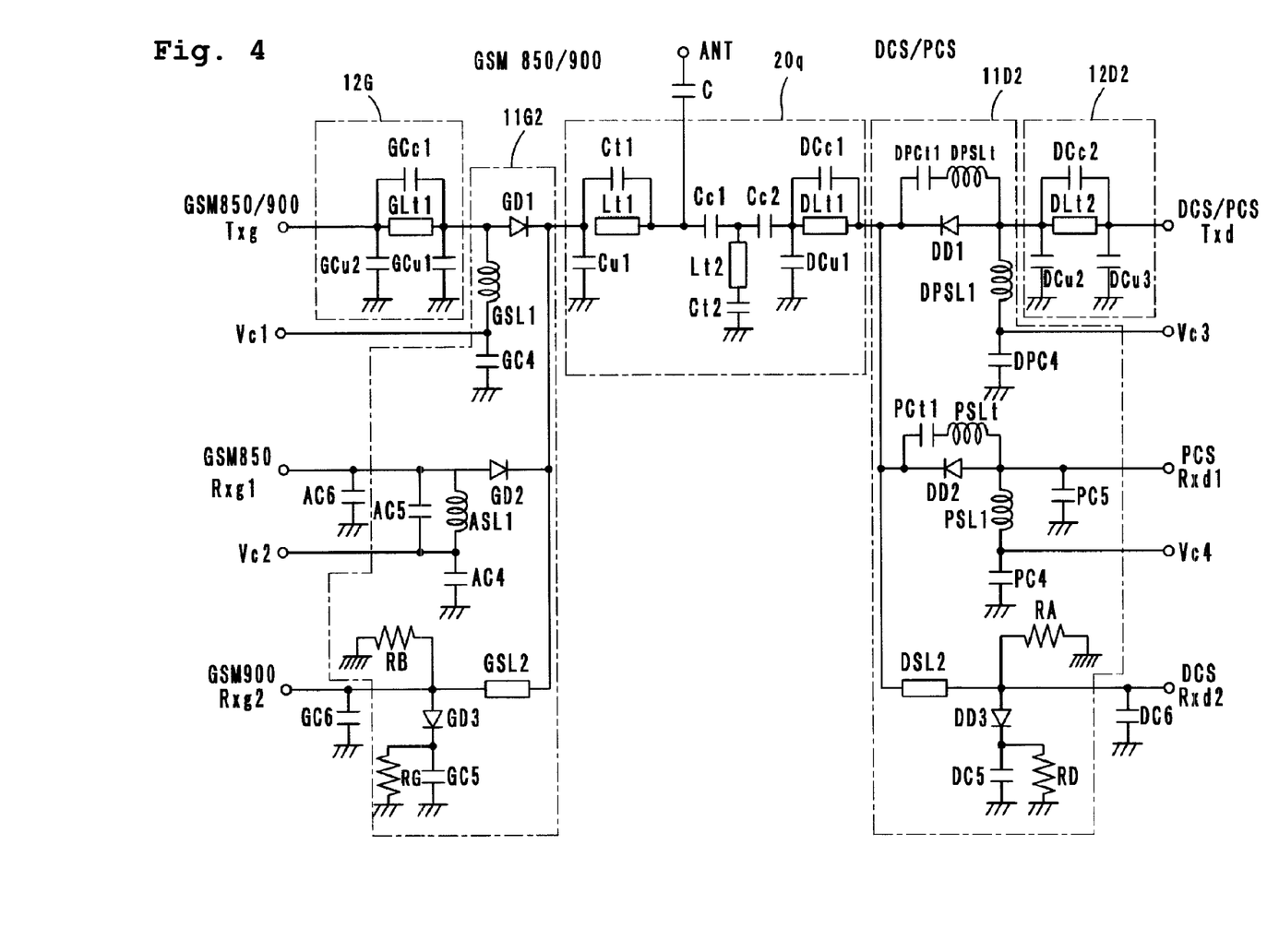
FIG. 4 is an equivalent circuit diagram for explaining a fourth preferred embodiment of a high-frequency switch according to the present invention.

Shown in FIG. 4

As shown in an equivalent circuit in FIG. 4, a quad-band high-frequency switch according to a fourth preferred embodiment includes four different communication systems including two types of GSM systems, namely, a GSM 850 system, a GSM 900 system, a PCS system, and a DCS system.

A diplexer 20q selects transmission signals from the DCS/PCS system and the GSM system at the time of transmission, and selects reception signals to the DCS/PCS system or the GSM system at the time of reception. The diplexer 20q is preferably constructed by connecting inductors Lt1, Lt2, and DLt1, and capacitors Cc1, Cc2, Ct1, Ct2, Cu1, DCc1, and DCu1. A parallel circuit including the inductor Lt1 and the capacitor Ct1 is series-connected to a signal path of the GSM system, and one side of the parallel circuit associated with the first transmission-side input terminal Txg is grounded via the capacitor Cu1. Furthermore, a parallel circuit includes the inductor DLt1 and the capacitor DCc1 that are series-connected to a signal path of the DCS/PCS system, and one side of the parallel circuit associated with the antenna terminal ANT grounded via the capacitor DCu1.

Furthermore, a series circuit including the capacitors Cc1 and Cc2 is series-connected to the signal path of the DCS/PCS system, and a node between the capacitors Cc1 and Cc2 is grounded via the inductor Lt2 and the capacitor Ct2. The low-pass filter is added in the DCS/PCS system to supplement a second LC filter 12D2.

A first high-frequency switch 11G2 is preferably constructed by connecting diodes GD1, GD2, and GD3 that function as switching elements, inductors GSL1, GSL2, and ASL1, capacitors GC4, GC5, and AC4, and resistors RG and RB. The first diode GD1 is series-connected to a signal path of the GSM system between the antenna terminal ANT and the first transmission-side input terminal Txg so that the cathode thereof is on the side of the antenna terminal ANT. Furthermore, between the anode of the first diode GD1 and the ground, the inductor GSL1 and the capacitor GC4 are series-connected with the capacitor GC4 on the ground side. Furthermore, a control power supply terminal Vc1 is connected to a node between the inductor GSL1 and the capacitor GC4.

The second diode GD2 is series-connected to a signal path of the GSM system between the antenna terminal ANT and the reception-side output terminal Rxg1 so that the cathode thereof is on the side of the antenna terminal ANT. Furthermore, between the anode of the second diode GD2 and the ground, the inductor ASL1 and the capacitor AC4 are series-connected with the capacitor AC4 on the ground side. A control power supply terminal Vc2 is connected to a node between the inductor ASL1 and the capacitor AC4. Furthermore, a capacitor AC5 is parallel-connected to the inductor ASL1. Furthermore, a capacitor AC6 is connected between the anode of the second diode GD2 and the ground.

The third diode GD3 is shunt-connected to a signal path of the GSM system between the antenna terminal ANT and the reception-side output terminal Rxg2, and the cathode thereof is grounded via the capacitor GC5. One end of the resistor RG is connected to a node between the third diode GD3 and the capacitor GC5, and the other hand of the resistor RG is connected to the ground. Furthermore, the inductor GSL2 is series-connected to a signal path extending on the side of the antenna terminal ANT from the anode of the third diode GD3, and a capacitor GC6 is connected between the anode of the third diode GD3 and the ground. Furthermore, one end of the resistor RB is connected to the anode of the third diode GD3, and the other end of the resistor RB is grounded.

A first LC filter 12G is disposed between the first high-frequency switch 11G2 and the first transmission-side input terminal Txg, and it is a low-pass filter including an inductor GLt1 and capacitors. The capacitors of the low-pass filter include a capacitor GCc1 that is parallel-connected to the inductor GLt1 and two ground capacitors (shunt capacitors) GCu1 and GCu2 that are connected to the ground.

A second high-frequency switch 11D2 is preferably constructed by connecting diodes DD1, DD2, and DD3 that function as switching elements, inductors DPSL1, PSL1, DPSLt, and PSLt, capacitors DC5, DPC4, PC4, PC5, PCt1, and DPCt1, and resistors RD and RA. The fourth diode DD1 is series-connected to a signal path of the DCS/PCS system between the antenna terminal ANT and the second transmission-side input terminal Txd so that the cathode thereof is on the side of the antenna terminal ANT. Furthermore, between the anode of the fourth diode DD1 and the ground, the inductor DPSL1 and the capacitor DPC4 are series-connected with the capacitor DPC4 on the ground side. Furthermore, a control power supply terminal Vc3 is connected to a node between the inductor DPSL1 and the capacitor DPC4. Furthermore, a series circuit including the capacitor DPCt1 and the inductor DPSLt is parallel-connected to the fourth diode DD1.

The fifth diode DD2 is series-connected to a signal path of the DCS/PCS system between the antenna terminal ANT and the reception-side output terminal Rxd1 so that the cathode thereof is on the side of the antenna terminal ANT. Furthermore, between the anode of the fifth diode DD2 and the ground, the inductor PSL1 and the capacitor PC4 are series-connected with the capacitor PC4 on the ground side. A control power supply terminal Vc4 is connected to a node between the inductor PSL1 and the capacitor PC4. The capacitor PC5 is connected between the anode of the fifth diode DD2 and the ground. Furthermore, a series circuit including the capacitor PCt1 and the inductor PSLt is parallel-connected to the fifth diode DD2.

The sixth diode DD3 is shunt-connected to a signal path of the DCS/PCS system between the antenna terminal ANT and the reception-side output terminal Rxd2, and the cathode thereof is grounded via the capacitor DC5. One end of the resistor RD is connected to a node between the sixth diode DD3 and the capacitor DC5, and the other end of the resistor RD is connected to the ground. Furthermore, the inductor DSL2 is series-connected to a signal path extending on the side of the antenna terminal ANT from the anode of the sixth diode DD3, and the capacitor DC6 is connected between the anode of the sixth diode DD3 and the ground. Furthermore, one end of the resistor RA is connected to the anode of the sixth diode DD3, and the other end of the resistor RA is grounded.

A second LC filter 12D2 is disposed between the second high-frequency switch 11D2 and the second transmission-side input terminal Txd, and it is a parallel circuit including an inductor DLt2 and a capacitor DCc2. The ends of the inductors Dlt2 are grounded individually via the capacitors DCu2 and DCu3.

Next, an operation of the high-frequency switch configured as described above will be described. First, when transmitting a transmission signal of the DCS/PCS system, in the second high-frequency switch 11D2, for example, about 2.5 V is applied to the control power supply terminal Vc3 to turn on the fourth diode DD1 and the sixth diode DD3. Thus, the transmission signal of the DCS/PCS system, input from the second transmission-side input terminal Txd, is passed through the second high-frequency switch 11D2 and the diplexer 20q, and is transmitted from the antenna terminal ANT.

At this time, in the first high-frequency switch 11G2 of the GSM system, for example, 0 V is applied to the control power supply terminal Vc1 to turn off the first diode GD1, so that a transmission signal of the GSM system is not transmitted. Furthermore, by connecting the diplexer 20q, the transmission signal of the DCS/PCS system is prevented from leaking to the first transmission-side input terminal Txg and the first reception-side output terminals Rxg1 and Rxg2 of the GSM system. Furthermore, the second LC filter 12D2 of the DCS/PCS system and the filter circuit of the diplexer 20q attenuate second and third harmonics of the DCS/PCS system.

Next, when transmitting a transmission signal of the GSM system (850/900 MHz band), in the first high-frequency switch 11G2, for example, about 2.5 V is applied to the control power supply terminal Vc1 to turn on the first diode GD1 and the third diode GD3. Thus, the transmission signal of the GSM 850/900 system is passed through the first LC filter 12G, the first high-frequency switch 11G2, and the diplexer 20q, and is transmitted from the antenna terminal ANT. At this time, the second diode GD2 is turned off, and the isolation of the diode GD2 prevents the transmission signal from leaking to the reception-side output terminal Rxg1.

Furthermore, an inductance component of the third diode GD3 in the ON state and the capacitor GC5 cause series resonance to exhibit an impedance of substantially 0, so that the inductor GSL2 is short-circuited to the ground. Thus, by causing phase rotation by the inductor GSL2 so that the impedance viewed from the transmission-side input terminal Txg of the GSM system becomes close to an open state, the transmission signal is prevented from leaking to the reception-side output terminal Rxg2. In this state, the other control power supply terminals Vc2, Vc3, and Vc4 are set to 0 V.

Next, when receiving a reception signal of the GSM 850 system, in the first high-frequency switch 11G2, for example, about 2.5 V is applied to the control power supply terminal Vc2 to turn on the second diode GD2 and the third diode GD3, so that the signal input from the antenna terminal ANT is output to the reception-side output terminal Rxg1. At this time, the first diode GD1 is turned off, and the isolation of the first diode GD1 prevents the reception signal from leaking to the transmission-side input terminal Txg.

Furthermore, an inductance component of the third diode GD3 in the ON state and the capacitor GC5 cause series resonance to exhibit an impedance of substantially 0, so that the inductor GSL2 is short-circuited to the ground. Thus, by causing phase rotation by the inductor GSL2 so that the impedance viewed from the reception-side output terminal Rxg2 becomes close to an open state, the reception signal is prevented from leaking to the reception-side output terminal Rxg2. In this state, the other control power supply terminals Vc2, Vc3, and Vc4 are set to 0 V.

Next, when receiving a reception signal of the GSM 900 system, in the first high-frequency switch 11G2, for example, 0 V is applied to the control power supply terminals Vc1 and Vc2 to turn off the first diode GD1, the second diode GD2, and the third diode GD3. Thus, the signal input from the antenna terminal ANT is output to the reception-side output terminal Rxg2. At this time, the isolation of the first diode GD1 prevents the reception signal from leaking to the transmission-side input terminal Txg. Furthermore, the isolation of the second diode GD2 prevents the reception signal from leaking to the reception-side output terminal Rxg1.

Now, a switching operation from the transmission mode to the reception mode in the GSM system will be described. In the transmission mode, the first diode GD1 and the third diode GD3 are in the ON states. Charges accumulated in the first diode GD1 at this time will be denoted as Q1, and charges accumulated in the third diode GD3 at this time will be denoted as Q3. In this state, in order to switch from the transmission mode to the reception mode for reception by the reception-side output terminal Rxg2, it is needed to set the control power supply terminal Vc1 to 0 V, release charges accumulated in the diodes GD1 and GD3, and turn off the diodes GD1 and GD3. At this time, since the resistor RB is connected between the ground and a node between the first diode GD1 and the third diode GD3 that are series-connected, the charges accumulated in the diodes GD1 and GD3 can be released immediately. Thus, quick switching from the transmission mode to the reception mode of the GSM 900 system is achieved. Particularly, quick switching is not achieved when the amount of the accumulated charges Q1 of the first diode GD1 is large. The fourth preferred embodiment overcomes this problem, similarly to the first to third preferred embodiments described earlier.

Next, when receiving a reception signal of the PCS system, in the second high-frequency switch 11D2, for example, about 2.5 V is applied to the control power supply terminal Vc4 to turn on the fifth diode DD2 and the sixth diode DD3. Thus, the signal input from the antenna terminal ANT is output to the reception-side output terminal Rxd1. At this time, the fourth diode DD1 is turned off, and the isolation of the fourth diode DD1 prevents the reception signal from leaking to the transmission-side input terminal Txd.

Furthermore, an inductance component of the sixth diode DD3 in the ON state and the capacitor DC5 cause series resonance to exhibit an impedance of substantially 0, so that the inductor DSL2 is short-circuited to the ground. Thus, by causing phase rotation by the inductor DSL2 so that the impedance viewed from the reception-side output terminal Rxd2 becomes close to an open state, the reception signal is prevented from leaking to the reception-side output terminal Rxd2. In this state, the other control power supply terminals Vc11, Vc2, and Vc3 are set to 0 V.

Next, when receiving a reception signal of the DCS system, in the second high-frequency switch 11D2, for example, 0 V is applied to the control power supply terminals Vc3 and Vc4 to turn off the fourth diode DD1, the fifth diode DD2, and the sixth diode DD3. Thus, the signal input from the antenna terminal ANT is output to the reception-side output terminal Rxd2. At this time, the isolation of the fourth diode DD1 prevents the reception signal from leaking to the transmission-side input terminal Txd. Furthermore, the isolation of the fifth diode DD2 prevents the reception signal from leaking to the reception-side output terminal Rxd1.

Now, an operation for switching from the transmission mode to the reception mode in the DCS/PCS system will be described. In the transmission mode, the fourth diode DD1 and the sixth diode DD3 are in the ON states. Charges accumulated in the fourth diode DD1 at this time will be denoted as Q1, and charges accumulated in the sixth diode DD3 at this time will be denoted as Q3. In this state, in order to switch from the transmission mode to the reception mode for reception by the reception-side output terminal Rxd2, it is needed to set the control power supply terminal Vc1 to 0 V, release charges accumulated in the diodes DD1 and DD3, and turn off the diodes DD1 and DD3. At this time, since the resistor RA is connected between the ground and a node between the fourth diode DD1 and the sixth diode DD3 that are series-connected, the charges accumulated in the diodes DD1 and DD3 can be released immediately. Thus, quick switching from the transmission mode to the reception mode of the PCS system is achieved. Particularly, quick switching is not achieved when the amount of the accumulated charges Q1 of the fourth diode DD1 is large. The fourth preferred embodiment overcomes this problem, similarly to the first to third preferred embodiments described earlier.

Furthermore, in the second high-frequency switch 11D2, LC series resonance circuits are connected individually to the diodes DD1 and DD2. Thus, in a transmission frequency band or a reception frequency band that is passed by the diode DD1 or DD2 in the ON state, an anti-resonance point occurs by a capacitance component of the diode DD1 or DD2 when the diode DD1 or DD2 is turned off. Accordingly, even better isolation can be achieved compared with the isolation achieved when the diodes DD1 and DD2 are in the OFF states.

It is to be understood that high-frequency switches according to the present invention are not limited to the preferred embodiments described above, and that various modifications are possible within the scope of the present invention.

As described above, the present invention is effective for a high-frequency switch that can be used with a plurality of different mobile communication systems, and is particularly favorable in that quick switching from a transmission mode to a reception mode can be achieved.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A high-frequency switch comprising:
    a switch having a first diode and a second diode, the first diode being series-connected to a transmission-side signal path between an antenna terminal and a transmission-side input terminal, the second diode being shunt-connected to a reception-side signal path between the antenna terminal and a reception-side output terminal, the switch allowing selective switching between the transmission-side signal path and the reception-side signal path; and
    a resistor; wherein
    one end of the resistor is connected between the first diode and the second diode, and the other end of the resistor is connected to ground.

2. The high-frequency switch according to claim 1, wherein the other end of the diode shunt-connected to the reception-side output terminal is connected to a control power supply, and is connected to the ground via a capacitor.

3. The high-frequency switch according to claim 2, wherein the capacitor and an inductance component of the shunt-side diode in an ON state define a series resonance point with zero impedance.

4. The high-frequency switch according to claim 2, wherein the control power supply is a single power supply.

5. A high-frequency switch comprising:
an antenna terminal;
a first communication system;
a second communication system; and
a diplexer provided at a stage subsequent to the antenna terminal, the diplexer defining a branch between a signal path of the first communication system and a signal path of the second communication system, the high-frequency switch further comprising:
a first switch having a first diode and a second diode, the first diode being series-connected to a signal path between the antenna terminal and a first transmission-side input terminal in the signal path of the first communication system, the second diode being shunt-connected to a signal path between the antenna terminal and a first reception-side output terminal in the signal path of the first communication system, the first switch allowing selective switching between the signal path between the antenna terminal and the first transmission-side input terminal and the signal path between the antenna terminal and the first reception-side output terminal; and
a second switch having a third diode and a fourth diode, the third diode being series-connected to a signal path between the antennal terminal and a second transmission-side input terminal in the signal path of the second communication system, the fourth diode being shunt-connected to a signal path between the antenna terminal and a second reception-side output terminal in the signal path of the second communication system, the second switch allowing selective switching between the signal path between the antenna terminal and the second transmission-side input terminal and the signal path between the antennal terminal and the second reception-side output terminal; wherein
one end of a first resistor is connected between the first diode and the second diode, and the other end of the first resistor is connected to ground; and
one end of a second resistor is connected between the third diode and the fourth diode, and the other end of the second resistor is connected to the ground.

6. The high-frequency switch according to claim 5, wherein the other end of the diode shunt-connected to the reception-side output terminal is connected to a control power supply, and is connected to the ground via a capacitor.

7. The high-frequency switch according to claim 6, wherein the capacitor and an inductance component of the shunt-side diode in an ON state define a series resonance point with zero impedance.

8. The high-frequency switch according to claim 6, wherein the control power supply is a single power supply.

9. A high-frequency switch comprising:
an antenna terminal;
a first communication system;
a second communication system; and
a diplexer provided at a stage subsequent to the antenna terminal, the diplexer defining a branch between a signal path of the first communication system and a signal path of the second communication system and a third communication system, the high-frequency switch further comprising:
a first switch having a first diode and a second diode, the first diode being series-connected to a signal path between the antenna terminal and a first transmission-side input terminal in the signal path of the first communication system, the second diode being shunt-connected to a signal path between the antenna terminal and a first reception-side output terminal in the signal path of the first communication system, the first switch allowing selective switching between the signal path between the antenna terminal and the first transmission-side input terminal and the signal path between the antenna terminal and the first reception-side output terminal;
a second switch having a third diode and a fourth diode, the third diode being series-connected to a signal path between the antennal terminal and a second transmission-side input terminal in the signal path of the second communication system and the third communication system, the second transmission-side input terminal being a common terminal of the second communication system and the third communication system, the fourth diode being shunt-connected to a signal path between the antenna terminal and second and third reception-side output terminals in the signal path of the second communication system and the third communication system, the second switch allowing selective switching between the signal path between the antenna terminal and the second transmission-side input terminal and the signal path between the antenna terminal and the second and third reception-side output terminals; and
a duplexer defining a branch between a signal path provided between the second switch and the second reception-side output terminal and a signal path provided between the second switch and the third reception-side output terminal in the signal path of the second communication system and the third communication system; wherein
one end of a first resistor is connected between the first diode and the second diode, and the other end of the first resistor is connected to ground; and
one end of a second resistor is connected between the third diode and the fourth diode, and the other end of the second resistor is connected to the ground.

10. The high-frequency switch according to claim 9, wherein the other end of the diode shunt-connected to the reception-side output terminal is connected to a control power supply, and is connected to the ground via a capacitor.

11. The high-frequency switch according to claim 10, wherein the capacitor and an inductance component of the shunt-side diode in an ON state define a series resonance point with zero impedance.

12. The high-frequency switch according to claim 10, wherein the control power supply is a single power supply.

* * * * *